July 1, 1930.　　　T. FRANZ　　　1,769,217
PROCESS FOR DRESSING COAL, LIGNITE, AND LIKE MATERIALS
Filed Sept. 5, 1925
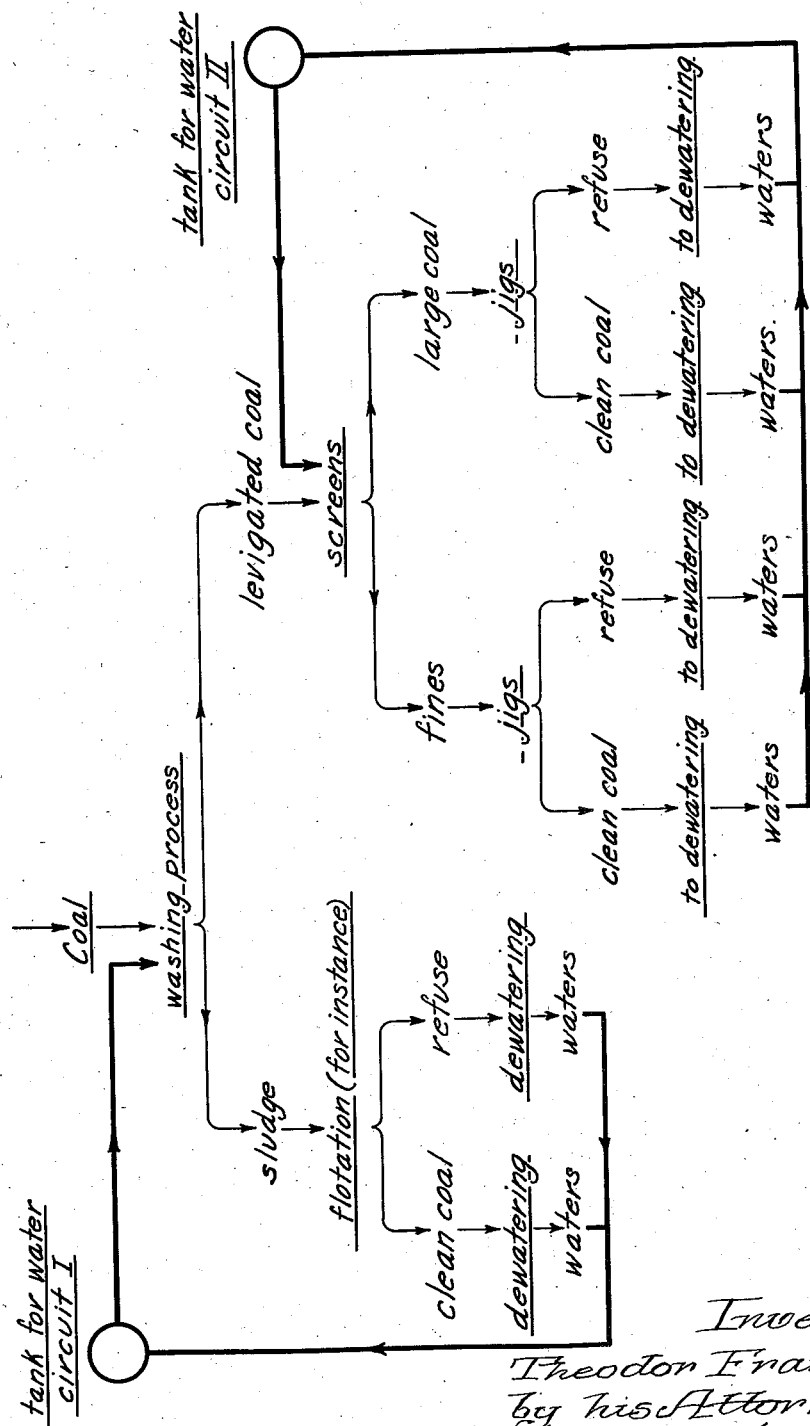

Patented July 1, 1930

1,769,217

UNITED STATES PATENT OFFICE

THEODOR FRANZ, OF BOCHUM, GERMANY

PROCESS FOR DRESSING COAL, LIGNITE, AND LIKE MATERIALS

Application filed September 5, 1925, Serial No. 54,843, and in Germany October 1, 1924.

Heretofore, as far as mechanical treatment has been employed the dressing of coal, lignite and like materials has been effected substantially according to the same general flow sheet, viz., the same method of treatment, and differs only in respect to the machinery and apparatus used. The large coal is separated in a dry state in the screening department, hand picked and loaded. The wash-coal arrives at the raw-coal bin, whence conveyors lift it to the (usually high-level) jig washer, where it is mixed with water and subjected to concentration. The concentrate consists of pure coal, which is transported directly to the place where it is to be utilized, whilst the sludge accompanying the effluent from the jig washer is generally returned to the separated fine grains thus fouling them once more, or is run into settling tanks, allowed to settle and used as boiler fuel. In these known processes the whole dressing is greatly impaired by the water in circulation being fouled by sludge and especially by salts, clay, loam and the like.

In recent years, an improved method has been in use, namely, removal of the duct by suction or screening, this method having for its principal object, by adding its products to the washed coking-coal to reduce the percentage of water in such coking-coal, or else to procure a product which can be used by itself as foundry powder, as coal dust or the like. On the other hand, a reduction of the quantity of sludge in the jig washer is obtained. However, this aim is realized in part only, owing to the inefficiency of the means employed for the purpose. The result in view is not achieved if the percentage of moisture of the coal exceeds a certain value.

Certain methods and apparatus for dressing the sludge proper have been proposed and partly used for the purpose, such as tables, vanners and the like. However, up to the present, such means have only enabled the sludge to be recovered after it has already fouled the cleaned coal, and only the coarser grains of the sludge even then.

Means and methods for the dressing of the finest sludge have recently become known, among which the flotation process has attained the greatest importance. Only by means of this latter is it possible to treat all the sludge of a wet-preparation plant in an economical manner and obtain practically complete separation into purified product and waste. Even this method, however, does not obviate the disadvantage that the sludge is not collected and fed to the flotation plant until it has already passed through the wet classifying apparatus (jigs, tables and the like).

Thus, prior improvements in coal preparation consists in improving the treatment of the sludge itself without eliminating the unfavorable influence of such sludge during the preceding classifying operation.

According to my present invention I obviate the existing drawbacks completely by removing and treating separately the sludge i. e. all substances which are soluble or suspensible in water or other preparatory liquids, prior to the wet mechanical classification proper. The former flow sheet or working diagram is thus rearranged completely and in the manner illustrated in the accompanying drawing, since the first step in the preparation now comprises the separation of the material under treatment into sludge in suspension, on the one hand, and coarser material free from sludge, on the other hand. These portions are then treated separately by suitable processes in order to obtain the finished products desired.

This definite initial separation introduces such advantages that the whole working of the wet classification process is improved greatly, and the results obtained are brought very near to the theoretical limit of perfection.

After separating out the large coal (usually pieces of more than 80 mm. in diameter) at the screens, the coals to be washed (80–0 mm. diameter) are passed on to the washery. By means of a charging device they are fed to an apparatus for separating the dry dust from the coarser coal. Then the rough coal passes on to suitable apparatus (drums or the like) for removing such material as is soluble or suspensible in the water. The separating of the washed coal from the liquid and the sludge contained therein is effected by means of suitable screens, a flushing device being used, if necessary, and the wet sludge is drawn off and subjected to flotation, or treatment on tables, vanners or the like, or by suitable combinations of operations whilst the coal remaining on the screens is separated into two sizes and passed on to the jigs, grains of 80–10 mm. passing through the coarse jig, and grains of less than 10 mm. through the fine jig. In the older methods, the sludge was formed in these jigs, whereas according to my present invention it has already been separated from the coal; hence a very clean separation is effected, and the water used will remain nearly free from sludge, thus, on the one hand, improving the quality of the products, and on the other hand, influencing favorably the quantitative results of the separation process.

The flotation treatment separates the sludge into clean coal and dross, with perhaps some intermediate products. The dross passing away as tailings contains nearly all the suspended clayey matter, together with fine iron-pyrites, fine sand and dissolved salts, and is drawn off separately and passed to the dump. However, it may also be subjected to clarification, and the salts contained may be removed, so as to recover a serviceable, clarified water to be re-used for washing the sludge out of the coal. By this cycle of operations, I obtain the complete separation of the sludge system from the classifying system of the cleaned coal, so that even when the clarified water is used over again, no argillaceous matter or the like which has once been washed off can return to the wet-treatment system of cleaned coal. Of course several other combinations are possible; but, in principle, the circuit of the sludge water is completely separated from the other waters from the very beginning and is subjected to separate treatment. The cleaned coal recovered therefrom can alone be reunited with the purified products of the levigated materials.

As mentioned previously, the second part of the preparation, i. e. the further treatment of the levigated grains, is effected in a known manner and by known means, which, according to my invention also have their own separate water circuits. The waters used in, and formed during, the preparation processes are subjected to the usual clarification, for example in "spitzkasten". Here, however, the great difference exists, in comparison with the prior state of the art, that these waters are not contaminated by any substantial quantity of dross or argillaceous ingredients but only by fine coal resulting from the attrition of the coal itself, which will easily settle in the bottom of the spitzkasten. Experience has shown that this fine coal is of the same quality as the coal treated in the jigs, hence the fine coal may be mixed without requiring any further treatment, with the coal treated in the jigs without impairing the latter; it may, however, also be recovered and treated separately. This fine coal, having been formed independently, does not become mixed with the sludge; and, therefore, the treatment of the sludge is facilitated in comparison with prior methods.

A further advantage of the invention consists in that the waters can be well and easily clarified, owing to the absence of argillaceous ingredients, salts and the like. This results in smaller clarifying plants and a considerably purer return-water for the jigs than was heretofore obtainable.

It will be possible, of course, to divert partial streams from the main flow at any desired point and to direct them to other places without, however, influencing substantially the main flow. Thus, it will be advisable, when adding water for washing off the sludge, not to use any fresh water, but to make use of such a partial stream from the system of the levigated grains as, in point of composition, is the least suitable for the washing of the levigated coal, and to add the fresh water to the latter system only. On the other hand, it may often be unobjectionable to use the drainings from the purified product of the sludge system in the levigated-coal system. By such means, subordinate in themselves, the success of the invention as a whole may be increased considerably.

Generally, it will be sufficient to adhere to the flow-sheet given above, viz., washing the sludge out of the materials to be subjected to wet classification; it will be possible, however, to use all kinds of suitable combinations, to meet the needs of special cases, where it is desirable to remove the sludge earlier or, vice versa, the removal of other ingredients is to be effected prior to the removal of the sludge. The first-mentioned case will arise, if the sludge be washed out of the rough coal prior to picking out the large coal. Vice versa, there may happen to be a certain advantage in washing the large coal (80–10 mm.) by the old methods, as this coal can be sold at the same price notwithstanding the higher ash content, and there is, therefore, no reason for improving this coal by washing. At the time, however, there is a growing tendency to lower the ash content in coking-coal, i. e. small coal below 10 mm., in order to obtain a more valuable coke therefrom. In such a case, according to the invention, the process is so conducted that washing out the sludge begins only when said small coal is being treated, and from this point onwards the classification is carried out on two definitely separated products; sludge and levigated material. According to the principle of the invention it will be necessary in this case, either to use the waste water of the coarse-grain system in a separate circuit or to feed it to the system for washing out the sludge.

If the main product of the wet preparation be small coal, then it will seem appropriate first to disintegrate the large coal and not to wash out the sludge till after said coal has been crushed.

If intermediate products be formed in the plant and crushed for further preparation, then the washing out of the sludge will be postponed conveniently until after said crushing. The levigation of these intermediate products may take place in a separate circuit or they may be treated jointly with other coals to be freed from sludge.

It may be advantageous, e. g. when a very pure product is required to accomplish the process of removing the sludge not in one operation only but to carry it through in stages, whereby also intermediate disintegration or other intermediate operations may be performed between the separate stages.

As has been mentioned repeatedly in the foregoing, my invention is not limited to the methods and apparatus described, but it is applicable to all kinds of processes and apparatus suitable for the preparation of coal, lignite and like materials, always supposed the preparation to be of the wet order, viz., by the aid of liquids.

In summarizing my invention, the coal in bulk is first subjected to a screening operation in which the particles of 80 mm. in diameter or less pass through the screen; these siftings are then subjected to a suitable process in which the coal dust is removed from the coarser grains; the coarser grains are then passed to the washery in which the mass is subjected to a washing operation; the mass and the washing water are then discharged from the washery and pass over screens which separate the solid coal from the liquid sludge.

The solid coal is passed to the wet classifier in which the coal particles ranging in size from 10 to 80 mm. are separated from those ranging from 10 mm. to 0, each class being passed on to suitable jigs and washed.

The liquid or wet sludge is subjected to flotation, which separates the sludge into clean coal and dross. The clean coal is recovered and the dross passed to the dump.

The water used in the above operations is subjected to a clarifying process in a spitzkasten, and thereafter used again in the sludge circuit, fresh water being added to the general system via the coal washing circuit. Clean coal is recovered from the spitzkasten and mixed with the fine coal treated in the jigs.

I claim:

1. A method for the preparation of coal, lignite and similar substances containing soluble and suspensible materials according to which the mass to be treated is subjected to a washing operation in order to remove the sludge, the resulting products, sludge and coarser material being kept apart and treated separately during the succeeding stages of the preparation, and the effluent waters from the treatment of the sludge are re-utilized in a separate circuit for the treatment of the sludge.

2. A method for the preparation of coal, lignite and similar substances containing soluble and suspensible materials according to which the mass to be treated is subjected to a washing operation in order to remove the sludge, the resulting products, sludge and coarser material being kept apart and treated separately during the succeeding stages of the preparation, and the effluent waters from the treatment of the sludge are re-utilized in a separate circuit for the treatment of the sludge, an intermediate clarifying operation of said waters being effected prior to their re-utilization.

3. A method for the preparation of coal, lignite and similar substances containing soluble and suspensible materials according to which the mass to be treated is subjected to a washing operation in order to remove the sludge, the resulting products, sludge and coarser material being kept apart and treated separately during the succeeding stages of the preparation, and the effluent waters from the treatment of the coarser material are diverted into a separate circuit in order to be re-utilized in connection with the treatment of the coarser material in whole or in part.

4. A method for the preparation of coal, lignite and similar substances containing soluble and suspensible materials according to which the mass to be treated is subjected to a washing operation in order to remove the sludge, the resulting products, sludge and coarser material being kept apart and treated separately during the succeeding stages of the preparation, and the effluent waters from the treatment of the coarser material are diverted into a separate circuit in order to be re-utilized in connection with the treatment of the coarser material in whole or in part, an intermediate clarifying operation of said waters being effected prior to their re-utilization.

5. A method for the preparation of coal, lignite and similar substances containing soluble and suspensible materials according to which the mass to be treated is subjected to a washing operation in order to remove the sludge, the resulting products, sludge and coarser material being kept apart and treated separately during the succeeding stages of the preparation, and the fluids appearing at some points of the separate circuits are withdrawn from their respective circuits and conducted to other circuits of similar fluids.

6. A method for the preparation of coal, lignite and similar substances containing soluble and suspensible materials according to which the mass to be treated is subjected to a washing operation in order to remove the sludge, the resulting products, sludge and coarser material being kept apart and treated separately during the succeeding stages of the preparation, and the fluids appearing at some points of the separate circuits are withdrawn from their respective circuits and conducted to other circuits of similar fluids, and intermediate clarifying operations of said fluids being effected at desired points.

In witness whereof I have signed this specification.

THEODOR FRANZ.